United States Patent Office 2,933,461
Patented Apr. 19, 1960

2,933,461

METHOD FOR PRODUCING A CURED EXPANDED PHENOLIC-ALDEHYDE RESIN

Gerald A. Mullen, Pittsburgh, Pa., assignor to Westinghouse Electric Corporation, East Pittsburgh, Pa., a corporation of Pennsylvania No Drawing. Application August 31, 1954
Serial No. 453,405

1 Claim. (Cl. 260—2.5)

The present invention relates to cellular bodies and has particular reference to liquid compositions adapted to be expanded in situ to produce cellular thermoset resinous bodies and to processes for producing such bodies.

Expanded cellular thermoset resinous bodies and a process for producing the same are disclosed in U.S. Patent 2,653,139 which is assigned to the assignee of the present invention. According to that patent, such expanded bodies are prepared by a process which comprises admixing (a) between 50 and 90 parts by weight of a thermosetting partially reacted aqueous reaction product of a phenol and an aldehyde, (b) between 5 and .01 parts by weight of certain non-ionic and cationic surface active agents, (c) solutions of certain peroxides in an amount to provide free oxygen equal to that available in from 1 to 20 parts by weight of 100% hydrogen peroxide, and (d) from 49 to 2 parts by weight of certain strong acids, the total being 100 parts by weight, and allowing the mixture to react to produce a cellular resinous mass which cures rapidly and spontaneously to a thermoset state.

The expanded cellular thermoset resinous bodies produced by the process disclosed in the patent are particularly well suited for use for certain purposes. It has been observed, however, that those cellular bodies tend to shrink during curing and form, in certain instances, a relatively thick high-density skin on their outer surfaces. This thick skin reduces the thermal insulating properties of the cellular body and increases its gross density as well as its cost per cubic foot. The usefulness of the cellular body as an insulating material in refrigerators or the like and as a buoyant member on ships is, therefore, substantially reduced.

The object of the present invention is to provide a composition that comprises an admixture of components which will expand substantially instantaneously after admixture into a cellular thermoset resinous body having a thin skin on its outer surface.

A further object of the invention is to provide a composition that comprises an intimate admixture of ingredients of predetermined proportions which will foam within a relatively short period of time after admixture into an expanded cellular thermoset mass which will undergo little, if any, shrinkage during curing.

Another object of the invention is to provide a process for preparing such thermoset expanded resinous bodies.

A still further object is to provide articles of manufacture embodying such thermoset expanded resinous bodies.

Other objects of the invention will, in part, be obvious and will, in part, appear hereinafter.

Broadly, the present invention comprises expanded cellular resinous thermoset bodies which undergo little, if any, shrinkage during curing and which are prepared by admixing as essential ingredients (a) between 50% and 90% by weight of a thermosetting partially reacted aqueous reaction product of a phenol and an aldehyde, (b) between 5% and 0.1% by weight of at least one acid stable, water soluble material selected from the group consisting of non-ionic and cationic surface active agents, (c) between 1% and 30% by weight of at least one vaporizable liquid material selected from the group consisting of hydrocarbons and halogenated hydrocarbons which has a boiling point within the range of 50° C. and 125° C. and which is imiscible with the phenol-aldehyde reaction product, and (d) approximately 39% to 2% by weight of an acid catalyst, the catalyst comprising a mixture of from 85% to 25% by weight of phenol sulfonic acid and from 15% to 75% by weight of an acid selected from the group consisting of benzene sulfonic acid and sulfuric acid.

The expanded cellular thermoset resinous bodies of this invention undergo substantially no shrinkage during curing and have a relatively thin skin or covering on their outer surface. As a result, the foamed products of this invention have a lower gross density and greater thermal insulating properties than do the products disclosed in U.S. Patent 2,653,139. Furthermore, the particular components employed in forming the expanded cellular bodies of this invention undergo reaction much more quickly in the presence of the novel mixture of acid catalysts in the critical amounts herein disclosed, than do the components employed in the manner disclosed in U.S. 2,653,139.

The phenol-aldehyde resin (a) is a specific product and may be prepared by reacting one mole of at least one monohydric phenol selected from the group consisting of phenol (monohydroxy benzene), cresol, xylenol, and cresylic acid with from one to three moles of at least one aldehyde selected from the group consisting of formaldehyde, acetaldehyde, hexamethylenetetramine, furfuraldehyde, and reactive polymers of formaldehyde such as paraformaldehyde and polyoxymethylene. The reaction preferably is carried out in the presence of substantial quantities of water and in the presence of from 0.05% to 5%, based on the weight of the phenol, of one or more alkaline catalysts. Any conventional alkaline catalyst suitable for promoting the reaction of phenol and formaldehyde into a phenolic resin may be employed. Examples of such catalysts are sodium hydroxide, potassium hydroxide, barium hydroxide, calcium hydroxide, calcium oxide, sodium carbonate, sodium bicarbonate, barium carbonate, ethylene diamine, propylene diamine, ammonia, hexamethylenetetramine, and aniline. It will be appreciated that other alkali and alkaline earth metal oxides, hydroxides, carbonates, bicarbonates, and primary and secondary aliphatic and aromatic amines may be employed.

The reaction of the phenol and aldehyde is carried out at a temperature within the range of 50° C. and 125° C., with or without refluxing, for a period of time varying from one-half hour when using the maximum amount of the catalyst mixture and the highest temperatures to as much as twenty hours or longer using the minimum amount of the catalyst mixture and the lowest reaction temperatures.

After the reaction product has reached the desired state of reaction, it is partially dehydrated by applying a vacuum. It may be desired, though not necessary, to reduce the alkalinity of the reaction product, or even render it acidic, by treating it with acid prior to dehydration. Thus, the reaction product may have a pH varying from as high as about 11, due to the presence of the alkaline catalyst, to as low as about 3 resulting from the treatment with an acid.

For reducing the pH organic acids such as lactic, tartaric acid, citric acid, acetic acid, oxalic acid, malonic acid, maleic anhydride, phenol sulfonic acid, and formic acids will give good results. Mineral acids, such as hydrochloric, sulfuric and phosphoric acids, also may be introduced into the reaction product to reduce the pH.

The dehydration of the resinous reaction product, whether acidified or not, is carried out to provide a material containing between 3% and 25% by weight of water, the balance being the partially reacted phenol-aldehyde resin. With this amount of water, the resinous material should have a viscosity of between 1 and 250 poises when measured at 25° C. Excellent low density expanded cellular bodies have been obtained using phenol-aldehyde products having viscosities between 10 and 60 poises. The dehydration may be carried out under a vacuum of about five inches of mercury absolute pressure or lower with a temperature during vacuum dehydration varying from about 50° C. to about 100° C. The cooled product, after the partial dehydration, is a liquid aqueous composition that is stable for prolonged periods of time and can be employed in preparing the present expandible compositions at any time. A mixture of several different resins prepared as disclosed herein may be used.

The surface active agents (b) employed in the practice of the invention are selected from one or more non-ionic and cationic, water soluble, acid stable, surface active compounds. Particularly satisfactory results have been secured by employing surface active agents selected from the group consisting of non-ionic alkyl and fatty acid polyethers and alcohols wherein the alkyl and fatty acid groups contain over four carbon atoms. Examples of members of this group are the octadecylphenol ethylene oxide condensation product and the polymers of such product, dodecyl phenol ethylene oxide, and decyl phenol ethylene oxide sulfate; the manufacture of the members of this group is disclosed in detail in U.S. Patents 2,454,541; 2,454,542; 2,454,543; and 2,454,544. Alkyl aryl polyethylene glycol ethers having four to twenty carbon atom alkyl hydrocarbon groups and phenyl and substituted phenyl groups may be used. Examples are the polyethylene oxide ether of octadecyl phenol, the polyethylene oxide ether of ricinoleic acid and octyl phenol polyethylene glycol ether. Still other members of this group of non-ionic surface active agents are the sorbitan esters of acids having from 12 to 24 carbon atoms; for example, sorbitan monolaurate, sorbitan monopalmitate, sorbitan monostearate, sorbitan tristearate and sorbitan trioleate. The polyoxyalkylene sorbitan esters of organic acids containing from 12 to 24 carbon atoms have been found to be quite suitable. Examples of this latter group are polyoxyethylene sorbitan monolaurate, polyoxyethylene sorbitan tristearate, polyoxyethylene sorbitol monolaurate, polyoxypropylene-ethylene sorbitan monolaurate, and polyoxyethylene sorbitan pentaoleate. The preparation of some of these compounds is described in Patent 2,380,166. Examples of suitable quaternary ammonium compounds are cetyl dimethyl benyl ammonium chloride, octadecyl dimethyl benzyl ammonium chloride, octadecanol-9-dimethyl ethyl ammonium bromide, and diisobutylphenoxyethoxy ethyl dimethyl benzyl ammonium chloride. The suitable quaternary ammonium compounds should have at least two hydrocarbon alkyl groups attached to nitrogen. A halide, such as chlorine or bromine, is ordinarily attached to the nitrogen atom in these compounds. In particular, the acid stable, water soluble, non-ionic and cationic surface active agents disclosed herein have been found to be specific to the reaction and other surface active agents have been found to be unsatisfactory and not suitable in the satisfactory practice of the present invention.

The vaporizable material (c) employed forms an azeotropic mixture with the water present in the reaction mixture. This azeotropic mixture is vaporized by the heat given off when the acids are brought into contact with the resin. As the azeotropic mixture vaporizes the resin expands into a foam of cells which are quite small and uniform in size. The vaporizable materials employed are liquids selected from the group consisting of hydrocarbons and halogenated hydrocarbons which have boiling points within the range of 50° C. to 125° C. and which are immiscible with the phenol-aldehyde reaction product. Examples of suitable materials include unleaded white gasoline, N-hexane, N-heptane, N-octane, cyclohexane, and carbon tetrachloride. These vaporizable materials may be used either singly or in any suitable admixture of any two or more. These materials are employed in quantities amounting to between 1% and 30% by weight of the total composition.

The acid catalysts (d) employed in this invention comprise 39% to 2% by weight of the total composition and consist essentially of an admixture of 85% to 25% by weight of phenol sulfonic acid and from 15% to 75% by weight of at least one acid selected from the group consisting of benzene sulfonic acid and sulfuric acid. It is essential that the acids be employed in the critical relative amounts set forth hereinabove, since it has been determined that unsatisfactory results are obtained if the acids are used in amounts outside the ranges set forth herein. Thus, if less benzene sulfonic acid or sulfuric acid is employed than the amounts specified herein the rate of the reaction is relatively slow. On the other hand, if more benzene sulfonic acid or sulfuric acid is used than that herein specified charring of the reaction mixture occurs due to the high reactivity of these acids. The phenol sulfonic acid apparently acts as a common solvent for the acids and the other ingredients. Thus, it aids in effecting rapid distribution of the acids throughout the entire mixture, preventing localized charring which might result due to a relatively high concentration of the more reactive acids in certain portions of the mixture. The best results have been obtained using from 20% to 35% of the acids in the total mixture.

To illustrate this invention more fully the following examples are set forth. These examples are presented for illustrative purposes only and are not intended to limit the scope of the invention. The parts given are by weight unless otherwise indicated.

*Example I*

A phenol-aldehyde resin was prepared by reacting 1 mole of phenol with 2½ moles of 40% aqueous formaldehyde, the reaction being carried out in the presence of sodium hydroxide as a catalyst in a quantity amounting to 1½% of the weight of the phenol. The reaction was carried out for three hours without refluxing at a temperature of from 77° C. to 83° C. At the end of this period, sufficient lactic acid was added to reduce the pH of the reaction mixture to a value of 6. The acidified product was dehydrated under a vacuum varying from 25½ inches of mercury to 27½ inches of mercury to a final tempearture of 75° C. When cooled to room temperature, the resinous composition had a viscosity of between 46 and 65 poises. It contained approximately 15% water by weight.

*Example II*

The partial reaction product or phenol-aldehyde reaction product prepared as disclosed in Example I is employed in preparing the following composition:

| | Parts |
|---|---|
| Phenol formaldehyde resin | 200 |
| Condensation product of ethylene oxide and octadecyl phenol | 4 |
| Unleaded white gasoline | 30 |
| Phenol sulfonic acid | 21 |
| Benzene sulfonic acid | 4 |

The phenol formaldehyde resin is admixed initially with the condensation product of ethylene oxide and octadecyl phenol after which the gasoline is added thereto. The acids then are admixed with each other and added thereto, and the resultant mass is poured into a vessel. After a few seconds the mass expands into a cellular body which thermosets rapidly and undergoes a minor amount of shrinkage on curing. The foamed mass has a relatively thin skin on its outer surface making it suitable for use as thermal insulation, as a filler for spaces in buoyant members, or the like.

Example III

The following are admixed and caused to react in the manner described in Example II.

|  | Parts |
| --- | --- |
| Phenol formaldehyde reaction product | 200 |
| Condensation product of ethylene oxide and dodecyl phenol | 4 |
| Unleaded white gasoline | 50 |
| Phenol sulfonic acid | 22 |
| Sulfuric acid (96%) | 3 |

It will be noted that in this example the phenol sulfonic acid is present in a larger amount and the sulfuric acid is present in a smaller amount than has been found to be critical. The mass expands less rapidly than that of Example II into a foamed body which shrinks considerably during curing with the resultant formation of a relatively thick skin or outer covering.

Example IV

The following are admixed and caused to react in the manner described in Example II.

|  | Parts |
| --- | --- |
| Phenol formaldehyde resin | 200 |
| Octyl phenol polyethylene glycol ether | 2 |
| Unleaded white gasoline | 25 |
| Hydrogen peroxide (50% concentration) | 10 |
| Phenol sulfonic acid | 14 |
| Benzene sulfonic acid | 11 |

The mixture expands spontaneously into a foamed body which does not shrink on curing and which has a thin outer skin. This material is well suited for use as thermal insulation in refrigerators, hot water heaters or the like and is well suited for use as a buoyant member in ships, boats and the like.

Example V

The following were admixed and caused to react in the manner described in Example II.

|  | Parts |
| --- | --- |
| Phenol formaldehyde resin | 200 |
| Cetyl dimethyl benzyl ammonium chloride | 6 |
| Unleaded white gasoline | 30 |
| n-Heptane | 10 |
| Phenol sulfonic acid | 5 |
| Benzene sulfonic acid | 13 |
| Sulfuric acid (96%) | 3 |

This material foams spontaneously to yield a foraminous product which does not shrink on curing and has a thin skin.

Example VI

The following are admixed and caused to react in the manner described in Example II.

|  | Parts |
| --- | --- |
| Phenol formaldehyde resin | 200 |
| Condensation product of ethylene oxide and dodecyl phenol | 5 |
| Unleaded white gasoline | 30 |
| n-Octane | 10 |
| Phenol sulfonic acid | 6 |
| Benzene sulfonic acid | 24 |

The mixture of acids is above the range found to be critical. This material foams upon addition of the acid ingredients. However, the foamed body shrinks considerably on curing with the resultant undesirable formation of a relatively thick skin or outer covering.

Example VII

The following are admixed and caused to react in the manner described in Example II.

|  | Parts |
| --- | --- |
| Phenol formaldehyde reaction product | 200 |
| Condensation product of ethylene oxide and octadecyl phenol | 4 |
| Unleaded white gasoline | 25 |
| Carbon tetrachloride | 5 |
| Benzene sulfonic acid | 25 |

Upon addition of the benzene sulfonic acid, the mixture chars almost immediately and foams only to a slight degree. The product is dark in color and has an irregular cellular structure with large cavities. It is not satisfactory.

Any of the phenol-aldehyde reaction products disclosed in Examples IX-XII in U.S. Patent 2,653,139 may be substituted in whole or in part for the phenol-aldehyde resin disclosed in Example I of this invention and employed in Examples II, IV and V herein with substantially similar satisfactory cellular thermoset resinous bodies resulting.

As indicated in Example IV a peroxide may be incorporated in amounts ranging from about 1% to 15% by weight of the total composition for the purpose of reducing still further the gross density of the foamed products of this invention. The peroxide used preferably comprises an aqueous solution of hydrogen peroxide having a concentration of from 20% to 60% $H_2O_2$. Successful results also have been obtained, using solutions of methyl ethyl ketone peroxide of a concentration of from 40% to 80% in organic solvents, such as dimethyl phthalate. It has been determined that aqueous solutions of hydrogen peroxide are easier to handle and give outstanding uniformity of cellular product. For these reasons their use is preferred in practicing this modification of the present invention.

Compositions of extremely low flammability are obtained by incorporating therein phosphoric acid, pyrophosphoric acid, and polyphosphoric acid in relatively small amounts. For this reason it is desirable to incorporate these acids in compositions intended for commercial applications.

In order to provide for somewhat tougher cellular walls in the expanded thermoset resinous bodies, there may be included in the expansible composition, in an amount not exceeding 8% of the total composition, one or more thermoplastic resins selected from the group consisting of polyvinylals, polyvinyl esters, hydrolysis products of polyvinyl esters, cellulose esters, cellulose ethers, polyvinylidene chloride, polyacrylates, polymers of acrylic acid esters and polymers of alkyl acrylic acid esters. Examples of such materials which are particularly suitable for use include polyvinyl butyral, polyvinyl acetate, polyvinylidene chloride, cellulose acetate, ethyl cellulose, polyvinyl alcohol (for example, the 80% hydrolysis product of polyvinyl acetate), polymethacrylate, and polymethylmethacrylate.

Plasticity may be imparted to the phenol-aldehyde resin by incorporating up to ½ mole of a polyhydric alcohol per mole of phenol. Suitable polyhydric alcohols are glycerol and aliphatic liquid glycols of up to eight carbon atoms, such, for example, as diethylene glycol.

To secure a predetermined texture or to strengthen the cellular thermoset composition there may be added to the composition in an amount not exceeding 10% of the weight of the composition, certain finely divided inert solids. Finely divided silica flour, wood flour, walnut shell flour, asbestos fibers, silica gel, acetylene black, aluminum powder and mica are examples of suitable materials. Wood flour and finely divided cotton fibers, in particular, enable a tougher and stronger cellular product to be produced. The density of the expanded cellular thermoset resinous body is not increased significantly by the incorporation therein of these solid additives.

The cellular compositions of the present invention may be used as thermal insulation in refrigerators, hot water heaters, and the like, and as buoyant members such as, for example, boat hulls, floats, and the like. Structural members having great strength for a given weight may be prepared by combining the expanded cellular compositions with surface sheets or shells composed of steel, aluminum, wood, cloth, glass fiber, fabrics, and resin laminates. Thus, air foils for aircraft possessing great rigidity and strength may be prepared by shaping sheets of aluminum or steel alloy into the desired external shape of the air foil and then filling the internal spaces of the air foil with the composition of the present invention and permitting it to expand to fill the entire space. The resins in expanding will adhere to the surfaces of the sheets forming the air foil thereby imparting rigidity thereto.

The compositions of the present invention may be introduced into various molds lined with paper, cellophane, or other thin resinous liners and, after the composition has expanded and thermoset to fill the entire space, the shaped members may be removed from the molds. Such molded members may be employed for various purposes requiring extremely light shapes.

While the present invention has been described with reference to particular embodiments and examples, it will be understood, of course, that changes, substitutions, modifications and the like may be made therein without departing from its true scope.

I claim as my invention:

In the method of preparing a thermoset cellular resinous body comprising admixing and reacting as essential ingredients, all percentages being based upon the total weight of the cellular resinous body, (a) between 50% and 90% by weight of a thermosetting partially reacted aqueous reaction product obtained by reacting one mole of at least one phenol selected from the group consisting of phenol, cresol, xylenol and cresylic acid with from 1 to 3 moles of at least one aldehyde selected from the group consisting of formaldehyde, reactive polymers of formaldehyde, acetaldehyde, hexamethylenetetramine, and furfuraldehyde, the reaction being carried out in the presence of from 0.05% to 5%, based on the weight of the phenol, of an alkaline catalyst and in the presence of substantial amounts of water and at a temperature of between 50° C. and 115° C. for a time of between ½ hour and 20 hours, and dehydrating the reaction product while maintaining it at a pH of between 3 and about 11 to provide a resinous product containing between 3% and 25% water and having a viscosity of between 1 and 250 poises, (b) between 5% and 0.1% by weight of at least one acid stable, water soluble, surface active agent selected from the group consisting of non-ionic alkyl polyethers wherein the alkyl groups contain from 8 to 18 carbon atoms, (c) between 1% and 30% by weight of at least one vaporizable liquid material selected from the group consisting of unleaded white gasoline, N-hexane, N-heptane, cyclohexane, and carbon tetrachloride, said liquid being immiscible with the phenol-aldehyde reaction product, and (d) approximately 39% to 2% by weight of an acid catalyst, the improvement which comprises employing as the catalyst a mixture consisting of 85% to 25% by weight of phenol sulfonic acid and from 15% to 75% by weight of an acid selected from the group consisting of benzene sulfonic acid and sulfuric acid.

References Cited in the file of this patent

UNITED STATES PATENTS

| | | |
|---|---|---|
| 2,386,995 | Wigal | Oct. 16, 1945 |
| 2,446,429 | Nelson | Aug. 3, 1948 |
| 2,653,139 | Sterling | Sept. 22, 1953 |
| 2,744,875 | Thomas et al. | May 8, 1956 |
| 2,789,095 | Lindvig | Apr. 16, 1957 |

FOREIGN PATENTS

| | | |
|---|---|---|
| 578,838 | Great Britain | July 15, 1946 |
| 586,199 | Great Britain | Mar. 11, 1947 |